G. R. AUGUSTINE.
FLEXIBLE JOINT.
APPLICATION FILED MAY 11, 1912.
1,049,438.
Patented Jan. 7, 1913.
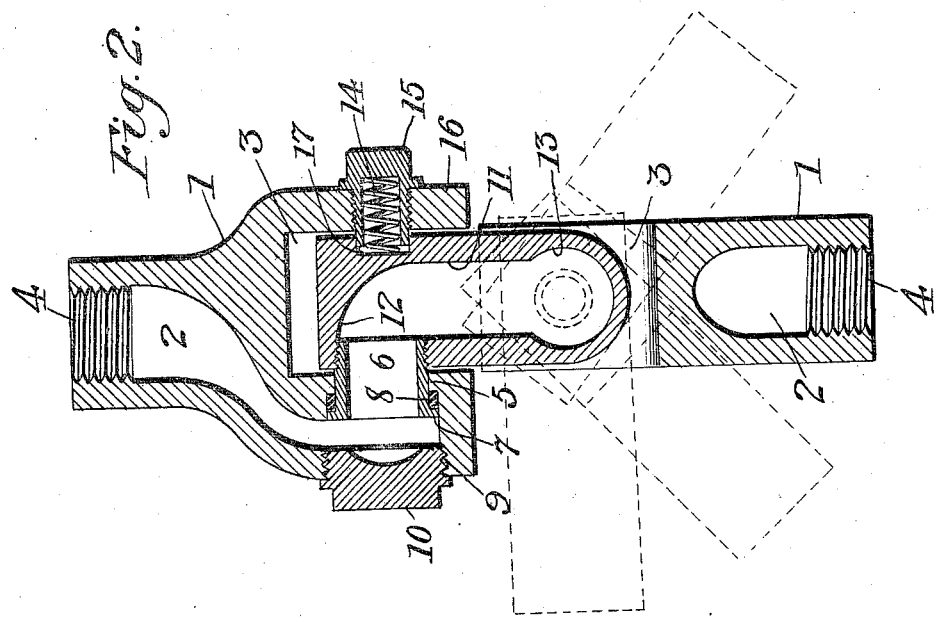
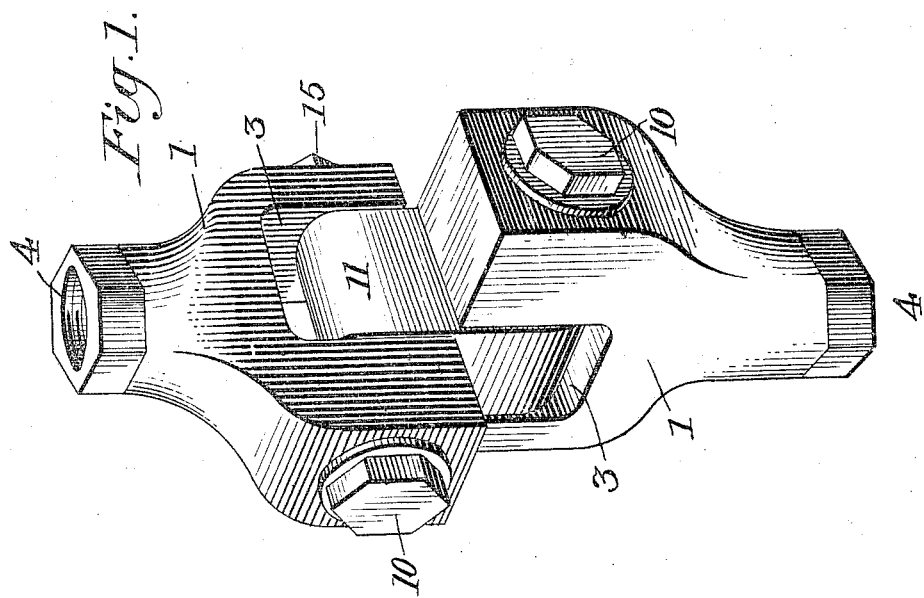
Witnesses.
D. W. Edelin.
Lillie M. Perry.
Inventor:
George R. Augustine
by Wm. W. Finckel
Atty.

UNITED STATES PATENT OFFICE.

GEORGE R. AUGUSTINE, OF TACOMA, WASHINGTON.

FLEXIBLE JOINT.

1,049,438.   Specification of Letters Patent.   Patented Jan. 7, 1913.

Application filed May 11, 1912. Serial No. 696,729.

*To all whom it may concern:*

Be it known that I, GEORGE R. AUGUSTINE, a citizen of the United States, residing at Tacoma, in the county of Pierce and State of Washington, have invented a certain new and useful Improvement in Flexible Joints, of which the following is a full, clear, and exact description.

The object of this invention is to provide a flexible or knuckle joint for metal pipes and the like for conveying air, steam, and other fluids under pressure, which while perfectly fluid-tight and capable of being flexed at many angles, yet lacks the stiffness due to friction in joints of the ball or universal type as commonly used, and of the elbow type, and avoids the hardening which affects rubber hose or tubing.

The invention consists of a flexible knuckle joint having a pair of similar hollow heads, connected substantially at right angles by a hollow connecting link which is swiveled at opposite ends in the heads, so that the heads may be turned to any desired position within an angle of ninety degrees; and it is this swiveling feature broadly and in detail which is a substantial novelty in my invention, as I will proceed now more particularly to explain and finally claim.

In the accompanying drawings illustrating the invention, in the several figures of which like parts are similarly designated, Figure 1 is a perspective view of one form of my flexible joint. Fig. 2 is a longitudinal section of same.

The head 1 is made hollow at 2 and 3, and the hollow part 2 terminates in a nipple 4 by means of which the head may be attached to a pipe. The hollow part 2 is provided with a counterbored hole 5 in which is arranged a sleeve 6. The outer end of the sleeve is screwthreaded and its inner end is provided with a flange 7 between which flange and the counterbored portion of the hole 5 is a compressible packing ring or gasket 8. Thus the sleeve affords the basis for the swiveling feature referred to. Opposite the hole 5 is a hole 9 through which the sleeve 6 is inserted into the hole 5, and this hole 9 is closed by a screw-cap 10. Within the hollow portion 3 is a hollow connecting-link 11, having lateral openings 12 and 13 at opposite ends, which openings are arranged at right angles to one another so that the opening 12 may communicate with the sleeve 6 of one head and the opening 13 may communicate with the sleeve 6 of the second head, when the latter is arranged at right angles to the first head, and thus afford communication through the two heads from a source of supply to a source of delivery.

In order to effect a fluid-tight joint of the connecting-link 11 with the heads, I provide a spring 14, preferably a coiled spring, and arrange this spring in a cap-nut 15 screwed into the outer wall 16 of the hollow portion 3, so that said spring will bear upon the connecting-link and tend to force it against the opposite wall. When pressure is admitted into the head, its force will be exerted against the pressure of the spring and consequently the connecting-link will be forcibly held against the tension due to the compression of the packing ring 8, and hence there will be a sort of compensation present which will permit of the easy and practically frictionless flexing of the joint as may be required in use. Obviously the joint may be flexed within ninety degrees, if measured in one direction from the vertical, although the joint may be moved in opposite directions within a similar angle, as indicated by the dotted lines in Fig. 2. Whenever the pressure is reduced, or relieved, the gasket 8 and spring 14 will serve to throw the link into a median position, without strain. If desired, the cap-nut 15 may have its inner end projecting into a recess 17 in the connecting-link, so as to serve as a sort of journal upon which the link may be turned as it swivels with the sleeve 6.

These heads may be connected up with pipes to any apparatus or article or structure, where it is necessary or desirable to have a flexible joint in a pipe line; and any number of such joints may be arranged in each section, so as to insure any movement that will ordinarily be imposed upon the parts. The end sections of the pipes may be provided with suitable coupling members, so as to couple the two sections and thereby present a continuous pipe line. Of course, I do not limit this invention to any particular kind of coupling for coupling the two sections of pipe line in which the invention may be employed.

It will be noticed that as the connecting-link is pressed over against the outer wall of the head, the gasket surrounding the sleeve is compressed to insure a perfectly fluid-tight joint, and yet there never is and never can be such an excess pressure on the gasket as to create undue friction. In point of fact, by the arrangement described, there is a considerable reduction of the friction in comparison with flexible joints of the ball or elbow type, and there is a saving in the wear on the gasket. So far as pressure is concerned, it is to be noted that the heavier it is the tighter becomes the fluid-tight feature of the joint, and yet the point of contact is relatively so small that an increase in friction is practically negligible and indeed scarcely noticeable.

When four pairs of these heads are coupled together, as between cars, the joints will always balance themselves and hang free to flex with the movements of the cars, and when pressure is off there will be no tendency to wear out the joints as there is in ball and elbow joints, and especially those that have springs to hold the joints tight. When pressure is off, the spring will push the link back against the inner wall of the hollow portion 3, and thereby make a dust-tight and cinder-tight joint on that side, as well as take the pressure and weight off of the gasket.

It is to be noted that the invention here is of simple construction, without intricate parts; is not likely to get out of order, and does not require a skilled person to take it apart; and also that it requires few tools to repair it. In fact, the gasket is about the only part which will have to be replaced with any considerable frequency.

The joints may be applied to cars or engines without changing any of the piping, and they are more flexible than the ordinary hose used, and they do not, as is the case with hose, become hard and stiff by age and use. The joint is very strong and very durable, easy to apply, practically frictionless, and it is self-adjusting. It is applicable of course to a variety of machines where fluid-pressure is to be transmitted over or between movable parts, as in unloaders, steam shovels, dredges, cars, and engines.

I have shown and described one simple form of my invention, but it is to be understood that this form can be variously changed without departing from the spirit of the invention.

The heads may have cast with or applied to them suitable rings to receive uncoupling chains, so that when uncoupled the chain hooks may be hooked in the rings also. This will make a standard for the length of the chain and will make no change in the construction proper of the joint.

What I claim is:—

1. A flexible joint, having a head provided with two hollow portions, a sleeve arranged in a counterbored outlet hole in one of said hollow portions and having a flange adapted to be seated by pressure against the shoulder of said counterbored hole and a gasket interposed between said flange and shoulder, a hollow link attached to said sleeve and arranged to turn in the other hollow portion, a spring bearing against the side of the connecting-link opposite its connection with the sleeve, and a cap nut threaded in the outer wall of the link-receiving hollow portion and sustaining the spring so that said spring will tend to ease the pressure of the flange of said sleeve on its seat and thus minimize wear.

2. A flexible joint, having a head provided with two hollow portions, a sleeve arranged to turn in a counterbored outlet hole in one of said hollow portions and having a flange adapted to be seated by pressure against the shoulder of said counterbored hole and a gasket interposed between said flange and shoulder, a hollow link attached to said sleeve and arranged in the other hollow portion, a spring bearing against the side of the connecting-link opposite its connection with the sleeve and acting to ease the pressure of the flange of said sleeve on its seat, and a cap nut threaded in the outer wall of the link-receiving hollow portion and sustaining the spring, said cap nut entering a recess in the connecting link and serving as a bearing upon which the link turns.

In testimony whereof I have hereunto set my hand this second day of May A. D. 1912.

GEORGE R. AUGUSTINE.

Witnesses:
WILLIAM MARVER,
BURT C. HILLIARD.